Feb. 7, 1961 E. M. RUGG 2,970,663
COLLAPSIBLE CONTROL MAST FOR FORK-TYPE LIFT TRUCKS
Filed April 7, 1958
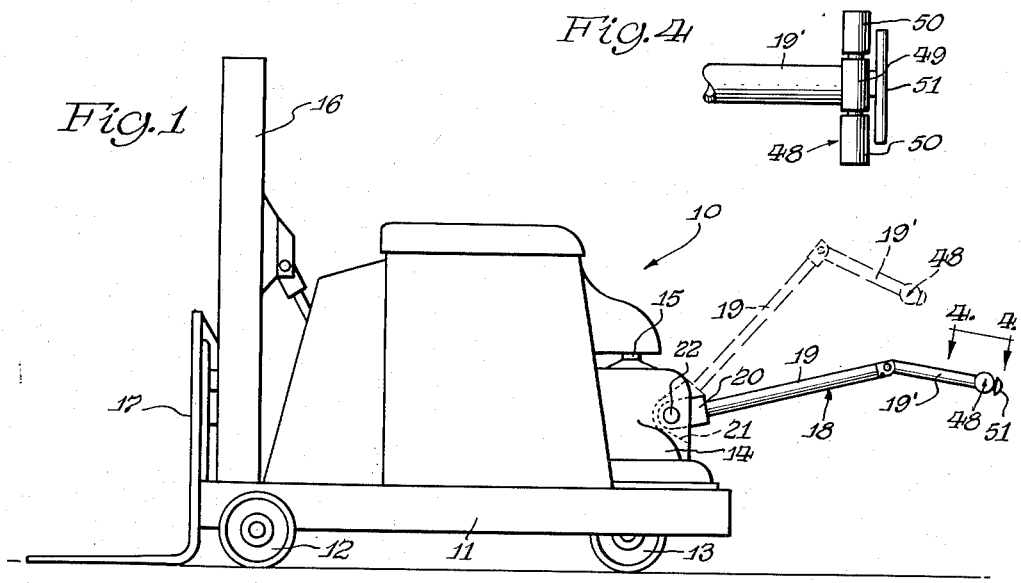
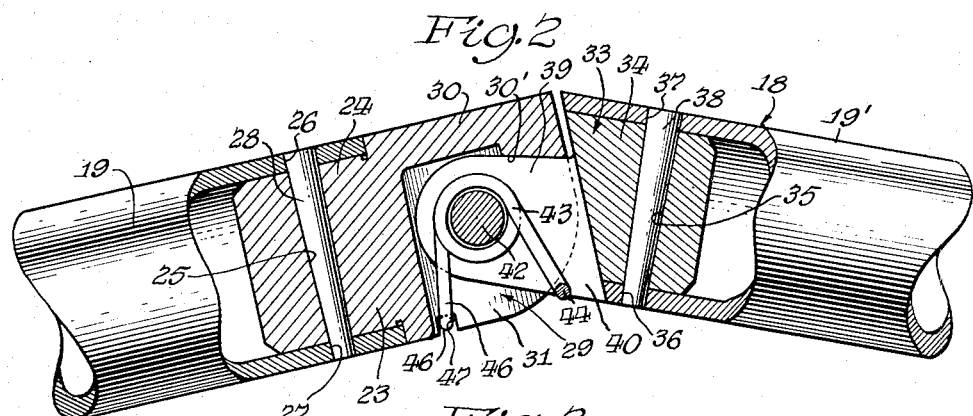
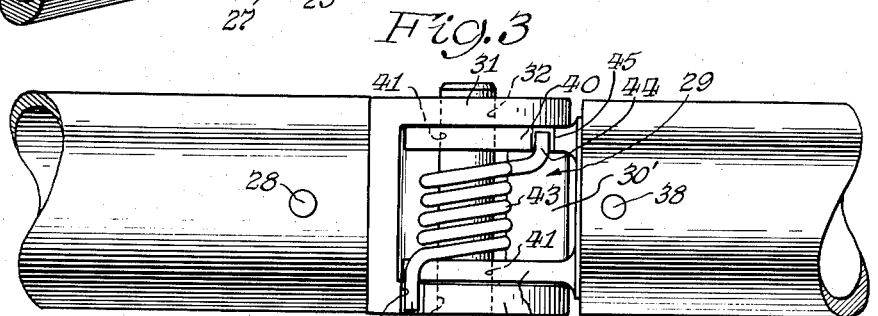
Inventor
E. Melvin Rugg
Paul O. Pippel
Attorney

United States Patent Office 2,970,663
Patented Feb. 7, 1961

2,970,663

COLLAPSIBLE CONTROL MAST FOR FORK-TYPE LIFT TRUCKS

E. Melvin Rugg, Chicago, Ill., assignor to International Harvester Company, Chicago, Ill., a corporation of New Jersey Filed Apr. 7, 1958, Ser. No. 726,769

1 Claim. (Cl. 180—19)

This invention relates to material handling trucks or vehicle and particularly to a fork-type of lift truck. More specifically the invention relates to a control mast particularly for controlling a fork-type lift truck.

The type of lift truck with which the present invention is concerned comprises generally a chassis having at one end a pair of laterally spaced drive wheels and at its other end a single steerable wheel. A fork-type lifting arrangement is supported on the chassis adjacent the drive wheels of the unit. The steerable wheel generally is steerable by means of a rotatable steering column which in turn has a control mast connected thereto. The control mast generally comprises an elongated member having at one end a handle including hand grips which are rotatable and which in turn control the power unit of the fork truck for causing forward or rearward movement of the truck. The control mast generally is connected to the steering column for hinging movement about a horizontal axis and the operator can steer the steering wheel by swinging the control mast from one side to the other, simultaneously actuating the truck control mechanism so that forward or rearward movement of the truck results.

With certain type fork trucks the control mast also includes an electrical reversing control assembly which is connected to the handle of the mast and which will automatically reverse the truck in a direction away from the operator if the handle of the truck comes in contact with the body of the operator or an obstruction which may be in the path of movement of the truck and control mast. This feature is a safety feature so that the truck will automatically reverse in the event that the control mast engages the operator, as might be the case, wherein due to inadvertence, the operator is pushed by the truck against a wall or obstruction. While a reversing control of this type may be satisfactory to reverse the vehicle, the initial impact of the handle against the body of the operator is sufficient generally to cause physical injury.

It is thus a prime object of this invention to provide an improved control mast assembly for lift trucks, the said control mast assembly providing for ready collapse of the mast, should the same come in contact with the operator during movement of the lift truck toward the operator or toward an obstruction.

It is another object of this invention to provide a safety device for a control mast of a fork-type lift truck, the said safety device assuring immediate collapse of the mast should the mast strike an obstruction during movement of the truck in a certain direction.

A more specific object is the provision of a control mast for fork-type lift trucks, the said control mast having a control handle including an automatic reversing mechanism for reversing the truck when the mast engages an obstruction, the mast also being quickly and resiliently collapsible during the said occurrence.

These and other objects of the invention will become more readily apparent from a reading of the description when examined in connection with the accompanying sheet of drawings.

In the drawing:

Figure 1 is a side elevational view of a lift truck showing an improved control mast therefor;

Figure 2 is an enlarged fragmentary side view, partially in section, of a hinging arrangement for a collapsible mast for lift trucks of the type shown in Figure 1;

Figure 3 is a bottom view of a portion of a mast assembly shown in Figure 2; and Figure 4 is an enlarged fragmentary view taken substantially along the line 4—4 of Figure 1.

Referring now particularly to Figure 1, a fork-type lift truck is generally designated by the reference character 10. The fork-type lift truck 10 comprises a body or chassis 11 supported on front drive wheels 12, only one of which is shown. The rear portion of the body 11 is supported by means of a steerable wheel 13 which is connected to a steering column 14 suitably pivoted as indicated at 15 on the truck 10. A lifting frame 16 is supported on the chassis 11 adjacent the drive wheels 12. The lifting frame has mounted thereon for vertical movement a fork-type lift cradle 17. The fork-type lift cradle 17 may be raised and lowered with respect to the lift frame 16 by conventional means.

A control mast 18 as shown in Figures 1, 2 and 3 comprises essentially a first tubular member 19 which is suitably connected to a pivot member 20 extending into a recess 21 of the steering column 14. A pivot pin 22 connects the pivot member 20 so that the same may pivot about a horizontal axis. A connecter member 23 is connected to the first tubular member 19 by means of a reduced portion 24 which fits into the first tubular member 19. The connecter member 23 comprises a tapered bore 25 which is in alignment with openings 26 and 27 in the tubular member 19. A taper pin 28 is driven through the opening 26 through the bore 25 and through the opening 27 for securely connecting the connecter member 23 to the tubular member 19.

The connecter member 23 includes a generally U-shaped aperture 29 formed by a top wall 30 and laterally spaced side walls 31. The wall 30 includes a sloping surface 30'. The side walls 31 include laterally spaced coaxial bores 32.

A second connecter member is indicated at 33. The connecter member 33 includes a portion 34 which fits into tubular member 19'. The portion 34 includes a tapered bore 35 which is coaxially aligned with openings 36 and 37 in the tubular member 19'. A tapered pin 38 within the openings 36, 37, and bore 35 secures the portion 34 on the tubular member 19'.

The portion 34 is provided with a projecting tongue 39 comprising a pair of spaced parallel fingers 40 which extend into the aperture 29. The fingers 40 include laterally spaced aligned openings 41 and a pin 42 is suitably secured through the openings 32 and 41 for pivotally mounting the tongue 39 relative to the connecter member 23. A coil spring 43 encircles the pin 42, the said coil spring 43 having an arm 44 which engages a socket 45 on one of the parallel fingers 40. The coil spring 43 further includes an arm 46 which engages a socket 47 in one of the walls 31. Thus the coil spring 43 resiliently urges or biases the second tubular member 19' in a slightly angled position with respect to the first tubular member 19 as shown in Figures 1 and 2. As shown in Figure 4, a control handle is generally designated at 48. The control handle 48 includes a tubular member 49 suitably connected to the tubular member 19' of the control mast 18. The tubular member rotatably mounts a pair of rotatable handle members 50. The rotatable handle members 50 are suitably connected to an electrical switching mechanism (not shown), one handle 50 causing operation of the power unit (not shown) which causes the truck to move in one direction, the other handle 50 being suitably connected by electrical means to actuate the power unit to move the truck in an opposite direction. This type of construction is conventional and forms part of the conventional control mast for operating the fork-type lift truck which is disclosed.

In order to provide some factor of safety, the conventional type of control mast also includes a reversing switch member 51 which may be actuated to reverse the movement of the truck 10 away from the operator under certain conditions which will hereinafter be described. This reversing switch mechanism is known in the art and need not be further described, it being sufficient to state that a suitable electrical circuit may be connected to the motor so that upon engagement of the member 51 reversing action of the power unit takes place.

Control of the lift truck 10 by means of the control mast 18 may be conventional. In other words, the operator may swing the control mast 18 from one side to another to effectuate the proper steering of the steerable wheel 13 and proper manipulation of the truck 10. Forward and rearward movement of the truck are controlled by the handles 50. Assuming now that the truck is moving toward the operator, and due to inadvertence of the operator, he fails to properly reverse the truck so that the truck places him against an obstruction with the truck continuing to advance. In this arrangement, the reversing member 51 may engage the operator's body whereupon it actuates to reverse the power unit of the truck to reverse its direction. In the conventional type of control mast assembly such a reversing mechanism is effective but it has been found that due to the initial momentum of the truck toward the operator, it still does not provide for the desired degree of safety since possible injury to the operator may result before the reversing mechanism can actually accomplish its intended function.

Thus the improved control mast assembly has been provided. The spring 43 normally maintains the control mast 18 in the position indicated wherein the tubular member 19' is positioned in an angled relation with respect to the tubular member 19. Upon impact of the tubular member 19' with an obstruction or with the body of an operator, it is readily apparent that the tubular member 19' can quickly jackknife with respect to the tubular member 19 so that the control mast 18 is placed in the collapsed position shown in the dotted line of Figure 1. Thus though the power unit may reverse due to the reversing member 51, it is also apparent that injury to the operator is completely avoided for the reason that the tubular member 19' can simultaneously be collapsed so that a high degree of safety is obtained.

Thus it is apparent that the objects of the invention have been fully achieved and that an improved control mast for fork-type lift trucks has been disclosed. It must be understood that changes and modifications may be made without departing from the spirit of the invention as disclosed or the scope thereof as defined in the appended claim.

What is claimed is:

For a truck having a body, laterally spaced power driven wheels on one end of said body, a steerable ground wheel on the opposite end of said body, and a steering column for rotating said steerable ground wheel; a control mast comprising a first tubular member, means pivotally connecting one end of said first tubular member to said steering column for pivotal movement about a horizontal axis, a first connecter member connected at one end to the opposite end of said first tubular member, said first connecter member having a generally U-shaped aperture at its opposite end, said aperture being defined by laterally spaced side walls, a top wall connecting said side walls, said aperture being open at its front and bottom, a second tubular member, a second connecter member having a tongue projecting into the open aperture, said tongue having a transversely extending bore, said side walls having aligned openings, the axes of which are transverse with respect to the axis of said first tubular member, a pin extending through said openings and said bore, a coil spring on said pin, said coil spring having one end engaging said first connecter member and a second end engaging said second connected member whereby said second tubular member is resiliently maintained in a substantially extended position relative to said first connecter member, and a handle on said second tubular member adapted to contain operator's control means, said second tubular member being adapted to jackknife relative to said first tubular member during movement of said truck in a direction whereby said mast encounters an obstacle.

References Cited in the file of this patent

UNITED STATES PATENTS

| | | |
|---|---|---|
| 1,276,067 | Hurd | Aug. 20, 1918 |
| 2,395,345 | Schreck | Feb. 19, 1946 |
| 2,746,315 | Ertsgaard et al. | May 22, 1956 |
| 2,815,083 | Ellingsworth | Dec. 3, 1957 |